United States Patent [19]

Linton

[11] Patent Number: 4,697,672

[45] Date of Patent: Oct. 6, 1987

[54] BI-DIRECTIONAL FORCE LIMITING NO-BACK MECHANISM

[75] Inventor: David J. Linton, Rockford, Ill.

[73] Assignee: Sundstrand Corporation, Rockford, Ill.

[21] Appl. No.: 715,676

[22] Filed: Mar. 25, 1985

[51] Int. Cl.[4] ............................................. B60T 7/12
[52] U.S. Cl. ............................... 188/134; 74/424.8 B; 192/7
[58] Field of Search ............... 188/134, 135, 110, 129; 192/4 R, 7, 150; 74/89.15, 411.5, 412 TA, 424.8 B

[56] References Cited

U.S. PATENT DOCUMENTS

| | | | |
|---|---|---|---|
| 1,833,224 | 11/1931 | Mullen et al. | 188/134 |
| 3,496,792 | 2/1970 | Ames | 188/134 X |
| 3,542,162 | 11/1970 | Kerr | 188/134 |
| 3,596,740 | 8/1971 | Nau | 188/134 |
| 3,835,967 | 9/1974 | Kerr | 188/134 |
| 3,898,817 | 8/1975 | Capewell et al. | 192/7 |
| 3,994,178 | 11/1976 | Hore | 74/89.15 |
| 4,030,578 | 6/1977 | Cacciola et al. | 188/134 |
| 4,176,733 | 12/1979 | Twickler | 188/134 |
| 4,318,304 | 3/1982 | Lang | 74/89.15 |
| 4,459,867 | 7/1984 | Jones | 74/89.15 |
| 4,466,511 | 8/1984 | Garnett | 188/134 |

OTHER PUBLICATIONS

A reduced reproduction of portions of drawing No. E2649-L5 of Sundstrand Corporation and bearing a number of dates in 1984.

Primary Examiner—Douglas C. Butler
Attorney, Agent, or Firm—Wood, Dalton, Phillips, Mason & Rowe

[57] ABSTRACT

A bi-directional force limiting no-back mechanism including a rotatable and axially shiftable shaft with a plate secured thereto. First and second ratchet wheels are generally coaxial with the shaft and relatively rotatable with respect thereto. The rachet wheels sandwich the plate and have peripheral ratchet teeth. First and second pawls are engageable with the ratchet teeth on respective ones of the ratchet wheels and first and second sets of force limiting teeth are disposed on the sides of the ratchet wheels opposite the plate. First and second stationary stops are respectively engageable with the sets of teeth upon axial movement of the associated ratchet wheel in a direction away from the plate. Preloaded springs bias the ratchet wheels toward the plate and stops limit movement of the ratchet wheels toward the plate.

8 Claims, 3 Drawing Figures

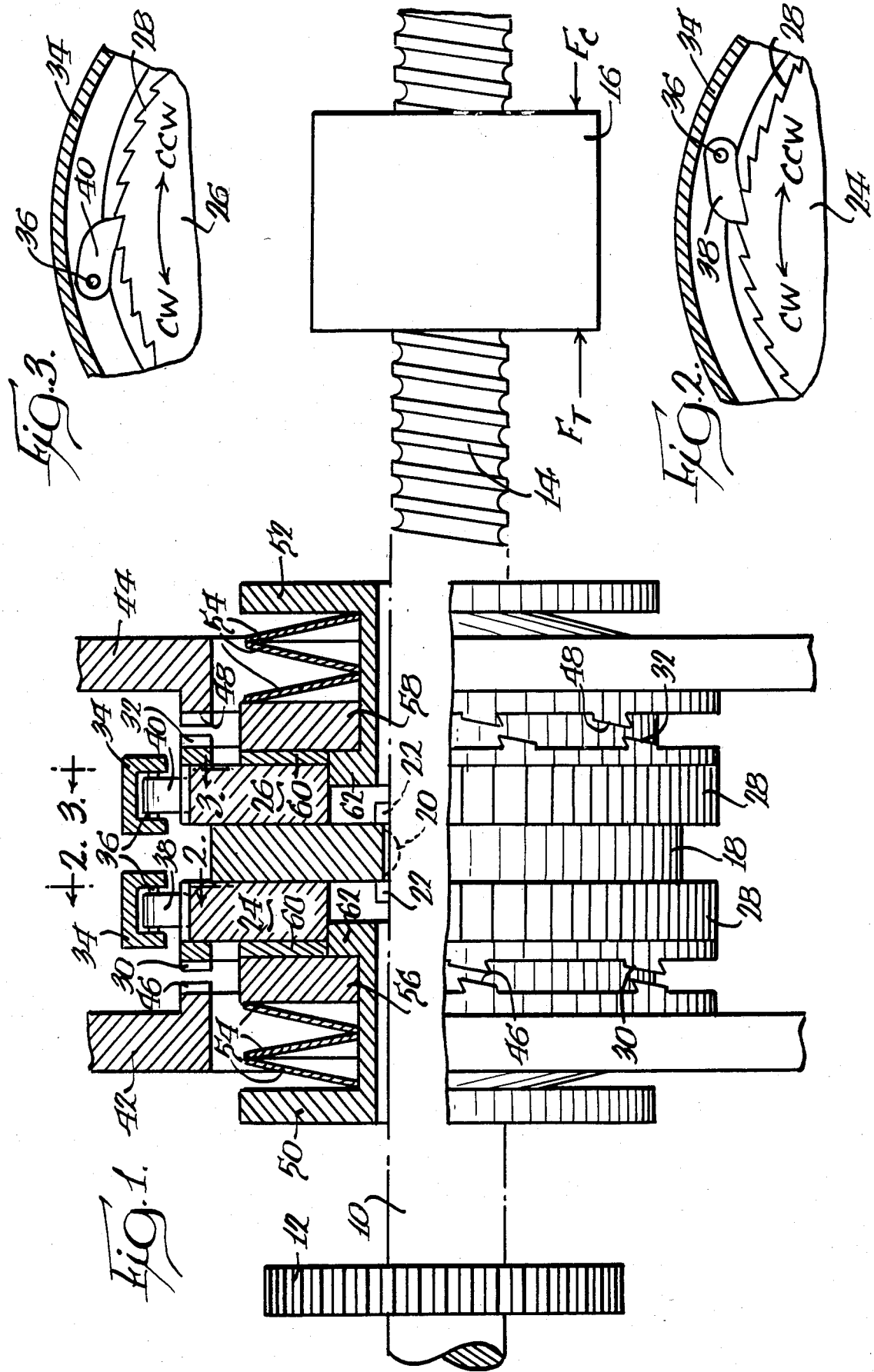

BI-DIRECTIONAL FORCE LIMITING NO-BACK MECHANISM

FIELD OF THE INVENTION

This invention relates to a mechanism or actuator that may be used in a bi-directional force transmitting system to limit the force that may be applied to the load and for preventing the power source from being driven by the load.

BACKGROUND OF THE INVENTION

Prior art of possible relevance includes the following U.S. Pat. Nos.: 3,596,740 issued Aug. 3, 1971 to Nau; 3,835,967 issued Sept. 17, 1974 to Kerr; 4,030,578 issued June 21, 1977 to Cacciola et al; 4,176,733 issued Dec. 4, 1979 to Twickler; and 4,318,304 issued March 9, 1982 to Lang. Of the foregoing, the above-identified Twickler patent is perhaps the most relevant.

In the operation of many types of apparatus wherein a power source drives a load, there arises the possibility that the load, due to various forces may have a tendency to drive the power source. There also arises the possibility that excessive force may be transmitted between components of the system.

One environment where either possibility can cause difficulties is in the movement of control surfaces, such as flaps, in aircraft. There are, of course others, such as winches or the like.

In any event, it is customary in many such environments to provide "no-back" means which prevent the load from driving or overrunning the power source. It is likewise common to provide means for limiting the amount of force that can be transmitted through a mechanism. It is further common to incorporate both a no-back feature and a torque limiting feature in a mechanism used to transmit power from a power source to a load. However, as can be seen from many of the above identified patents, it is customary, where both no-back and torque limiting features are employed, to effectively employ them in tandem, that is, as two separate mechanisms. The sole exception is that represented by the above-identified Twickler patent which provides a no-back feature and a torque limiting feature in a single package.

Twickler combines both a no-back feature and a torque limiting feature into one package and is a torque sensing and torque limiting device, while the invention disclosed herein is a force sensing, force limiting device that incorporates a no-back feature by the sensing of force and direction of rotation. The mechanism is intended to limit output of a device that is axially loaded whereby it provides a more direct and compact means of incorporating these features than pure rotary devices, such as Twickler.

Both compactness and simplicity are highly desirable when a mechanism having both no-back and force limiting features are utilized in aircraft since compactness will most frequently provide a weight saving and simplicity may provide improved reliability, both highly desirable in aircraft constructions.

SUMMARY OF THE INVENTION

It is the principal object of the invention to provide a new and improved combination no-back and force limiting mechanism. More specifically, it is an object of the invention to provide a combination force limiting and no-back mechanism which is extremely compact and which is extremely simple in construction.

An exemplary embodiment of the invention achieves the foregoing object in a force limiting no-back apparatus including a rotatable member which is operable to drive a load. Force limiting means are associated with the rotatable member and are operable in response to a predetermined axial movement of the rotatable member to preclude further rotation thereof. No-back means are also associated with the rotatable member to prevent attempted rotation of the rotatable member by the load. A sensing plate is carried by the rotatable member and is common to both the no-back means and the force limiting means. Parts of the no-back means coacting with the sensing means are suspended within parts of the force limiting means so that the no-back means does not preclude axial movement of the rotatable member necessary for operation of the force limiting means.

According to another facet of the invention, the rotatable member is a shaft which, upon rotation, axially drives a load. The force limiting means is operable in response to axial movement of the shaft due to a predetermined axial loading thereon. There is provided a sensing element mounted on the shaft to be movable both rotatively and axially therewith and which is disposed within parts of the force limiting means and no-back means for operating the two respectively in response to the predetermined axial loading or attempted rotation of the shaft by the load.

In a preferred embodiment, the parts of the force limiting means and the no-back means in which the sensing element is disposed are located on both sides of the element to provide bi-directional force limiting and no-back operation.

In a highly preferred embodiment of the invention, the apparatus includes a rotatable and axially shiftable shaft along with a plate secured to the shaft. First and second ratchet wheels are generally coaxial with the shaft and relatively rotatable with respect thereto and further sandwich the plate and are provided with peripheral ratchet teeth. First and second pawls are engageable with the ratchet teeth on a respective one of the ratchet wheels and first and second sets of force limiting teeth are disposed on the sides of respective ones of the ratchet wheels opposite of the sensing plates. First and second stationary stops are respectively engageable by the first and second sets of the force limiting teeth upon axial movement of the associated ratchet wheel in a direction away from the plate. Preloaded spring means bias the ratchet wheels toward the plate and stop means are provided for limiting movement of the ratchet wheels toward the plate. As a result of this construction, the ratchet wheels provide bi-directional no-back operation while the force limiting teeth and stops provide bi-directional force limiting operation in the system.

Other objects and advantages will become apparent from the following specification taken in connection with the accompany drawings.

DESCRIPTION OF THE DRAWINGS

FIG. 1 is a side elevation of an actuator made according to the invention with parts broken away and shown in section for clarity;

FIG. 2 is a fragmentary sectional view taken approximately along the line 2—2 in FIG. 1; and FIG. 3 is a sectional view similar to FIG. 2 and taken approximately along the line 3—3 in FIG. 1.

DESCRIPTION OF THE PREFERRED EMBODIMENT

An exemplary embodiment of a bi-directional force limiting no-back mechanism made according to the invention is illustrated in the drawings and with reference to FIG. 1 is seen to include a rotatable shaft 10 which is additionally axially movable to a slight degree. A driving force may be applied to rotate the shaft 10 bi-directionally by a power source (not shown) through a gear 12 on the shaft.

The shaft 10 is a screw shaft having threads 14 at one end to mount a nut 16 which is adapted to be connected to the load to be driven. As a consequence of this construction, it will be appreciated that rotation of the shaft 14 will be converted to linear motion of the nut 16 along the shaft axis. Preferably, the nut 16 is a conventional ball nut to provide smoothness of operation.

Intermediate its ends, the shaft 10 carries a sensing element or plate 18. The plate 18 is keyed to the shaft 10 by a key 20 to be rotatable with the shaft 10. Stops or collars 22 may be employed to assure that the plate 18 is movable axially with the shaft 10.

Sandwiching the plate 18 are ratchet wheels 24 and 26. The ratchet wheels 24 and 26 are generally coaxial with the shaft 10 and rotatable relative thereto. They are provided with ratchet teeth 28 on their periphery and, on their respective sides opposite from the plate 18, force limiting teeth 30 and 32 having the configuration illustrated in FIG. 1.

Non-rotatable housing-like structures 34 surround both of the ratchet wheels 24 and 26 and each, by means of a pivot pin 36 mounts a respective pawl 38 and 40. The pawls 38 and 40 are respectively engageable with the ratchet teeth 28 on the ratchet wheels 24 and 26. As can be seen, the pawl 38 will allow free rotation of the ratchet wheel 24 in the clockwise direction while preventing rotation in the counterclockwise direction. The pawl 40 provides the converse operation, namely, it permits free rotation in the counterclockwise direction while preventing rotation in the clockwise direction.

The assemblage further includes force limiting stop structures 42 and 44. The stop structure 42 includes a set of stop or force limiting teeth 46 which may engage with the teeth 30 on the ratchet wheel 24 under conditions to be described to prevent rotation of the ratchet wheel 24. Similar teeth 48 are provided on the stop structure 44 for halting rotation of the ratchet wheel 26.

The mechanism further includes spring retaining spools 50 and 52 on opposite sides of the sensing plate 18 in surrounding relation to the shaft 10. Each of the spools 50 receives a plurality of Belleville washers 54 in a prestressed or preloaded condition and which act against a perspective biasing ring 56 or 58. The biasing ring 56 acts through a thrust bearing 60 to bias the ratchet wheel 24 toward the plate 18 while the biasing ring 58 acts through an identical thrust washer 60 to bias the ratchet wheel 26 toward the plate 18. Flanges 62 on the spools 50 and 52 act to limit movement of the ratchet wheels 24 and 26 in response to the bias provided by the Belleville washers 54 and may also act to journal the ratchet wheels 24 and 26.

It will be appreciated that the just described structure will normally result in the force limiting teeth 30 and 46 for halting movement of the ratchet wheel 24 being in a disengaged state. Similarly, the force limiting teeth 32 and 48 for halting movement of the ratchet wheel 26 will likewise be disengaged under normal conditions.

The Belleville washers 54 are, as mentioned, preloaded to a desired degree so that a certain amount of axial force must be present before they will yield to allow axial shifting of the ratchet wheels 24, 26 such that the respective teeth 30 or 32 will engage with the teeth 46 or 48.

Force limiting occurs as follows. Where movement of the nut 16 to the right is resisted by the load or where the load is exerting an excessive force against the nut 16 tending to move the same to the left, a compressive force exists on the shaft 10 and is shown by an arrow designated $F_c$ in FIG. 1. This force will ultimately be applied against the Belleville washers 54 acting against the biasing ring 56. If the compressive force exceeds the biasing force, there will be an axial shift of the sensing plate 18 to the left as viewed in FIG. 1 which in turn will move the ratchet wheel 24 to the left against the bias of the washers 54 such that the teeth 30 and 46 will engage halting any further rotation of the ratchet wheel 24. The frictional engagement between the sensing plate 18 and the ratchet wheel 24 will halt rotation of the shaft 10 so that no additional force can be transmitted.

Where a tensile force shown as $F_t$ in FIG. 3 exists on the shaft 10 due to conditions opposite of those just described, identical action will occur on the opposite side of the sensing plate 18 with the result that the teeth 32 will be engaged with the teeth 48 to ultimately stop rotation of the shaft 10 and preclude additional force transmission.

For no-back situations, action is as follows. If the shaft 10 is being driven in a clockwise direction and the load attempts to drive the shaft 10 in the same direction, a tensile force $F_t$ will be exerted on the shaft 10 by the ball nut 16 which will slightly move the plate 18 to the right as viewed in FIG. 1 to more firmly frictionally engage the ratchet wheel 26 which, of course, cannot rotate in the clockwise direction by reason of engagement of the pawl 40 with the ratchet teeth 28. The resulting braking action will prevent the load from driving the shaft 10. Conversely, for counterclockwise rotation of the shaft to the gear 12, if the load attempts to drive the shaft, a force $F_c$ will come into existence thereby causing the plate 18 to shift slightly to the left as viewed in FIG. 1 such that the ratchet wheel 24 which cannot move in the counterclockwise direction, will tend to brake rotation of the shaft 10 by frictional engagement with the plate 18.

From the foregoing, it will be appreciated that a bi-directional force limiting no-back mechanism made according to the invention is extremely compact and simple in construction. Thus, the same offers a space and weight saving due to compactness and enhanced reliability due to simplicity.

I claim:

1. A force limiting no-back apparatus comprising:
a rotatable member operable by rotation thereof to drive a load, force limiting means associated with said rotatable member and operable in response to a predetermined axial movement of said rotatable member to preclude further rotation of said rotatable member, no-back means associated with said rotatable member to prevent rotation of the rotatable member by the load, a sensing plate on said rotatable member common to both said no-back means and said force limiting means, a portion of said no-back means coacting with said sensing plate and also comprising a protion of said force limiting means, and the no-back means allowing axial movement of the rotatable member necessary for operation of the force limiting means.

2. The apparatus of claim 1 wherein said portion of said no-back means comprise a pair of ratchet mechanisms, one on each side of said sensing plate and each having a ratchet wheel axially engageable by a respective side of said sensing plate and generally coaxial with said rotatable member; and said force limiter means include means axially engageable with each of said ratchet wheels oppositely of said sensing plate.

3. The apparatus of claim 2 wherein said sensing plate is axially movable with said rotatable member and adapted to axially drive said ratchet wheels into engagement with said axially engageable means.

4. The apparatus of claim 3 wherein said axially engageable means comprise two sets of teeth, one for each ratchet wheel and located on the sides thereof remote from said sensing plate, said force limiting means further including cooperating teeth on each of said ratchet wheels engageable with the teeth of a respective one of said sets, and means biasing said ratchet wheels away from the associated teeth set.

5. A force limiting no-back apparatus comprising:
   a rotatable and axially shiftable shaft;
   a plate secured to said shaft;
   first and second ratchet wheels generally coaxial with said shaft relatively rotatable with respect thereto, sandwiching said plate and having peripheral ratchet teeth;
   first and second pawls engageable with the ratchet teeth on a respective one of said ratchet wheels;
   first and second sets of force limiting teeth on the sides of the respective one of said ratchet wheels opposite of said plate;
   first and second stationary stops respectively engageable by said first and second sets of force-limiting teeth upon axial movement of the associated ratchet wheel in a direction away from said plate;
   pre-loaded spring means biasing said ratchet wheels towards said plate; and
   stop means limiting movement of said ratchet wheels towards said plate.

6. The apparatus of claim 5 wherein said shaft is a screw-shaft; and a nut on said shaft adapted to be connected to a load.

7. A force limiting no-back apparatus comprising:
   a rotatable and axially movable shaft operable by rotation thereof to axially drive a load, force limiting means associated with said shaft and operable in response to axial movement of said shaft due to a predetermined axial loading thereon to preclude further rotation of said shaft, no-back means associated with said shaft to prevent attempted rotation of the shaft by the load, a sensing element mounted on said shaft to be movable therewith and disposed within a portion of said force limiting means and said no-back means for operating said force limiting means and said no-back means respectively in response to said predetermined axial loading and attempted rotation of said shaft by the load.

8. The apparatus of claim 7 wherein said portion of said force limiting means and said no-back means are disposed on both sides of said element to provide bi-directional force limiting and no-back operation.

* * * * *